US009875181B2

United States Patent
Wee et al.

(10) Patent No.: US 9,875,181 B2
(45) Date of Patent: Jan. 23, 2018

(54) METHOD AND SYSTEM FOR PROCESSING MEMORY

(71) Applicants: Fingram Co., Ltd., Suwon (KR); QURAM Co., Ltd., Suwon (KR)

(72) Inventors: Young Cheul Wee, Suwon (KR); Seong Jin Yang, Gwangju (KR)

(73) Assignees: FINGRAM CO., LTD, Seoul (KR); QURAM CO., LTD., Seoul (KR)

( * ) Notice: Subject to any disclaimer, the term of this patent is extended or adjusted under 35 U.S.C. 154(b) by 0 days.

(21) Appl. No.: 14/802,432

(22) Filed: Jul. 17, 2015

(65) Prior Publication Data
US 2016/0019031 A1    Jan. 21, 2016

(30) Foreign Application Priority Data
Jul. 18, 2014    (KR) .......................... 10-2014-0090781

(51) Int. Cl.
G06F 9/44    (2006.01)
G06F 9/45    (2006.01)
(Continued)

(52) U.S. Cl.
CPC ...... *G06F 12/0253* (2013.01); *G06F 12/0269* (2013.01); *G06F 12/0276* (2013.01);
(Continued)

(58) Field of Classification Search
CPC ...... G06F 9/45504; G06F 9/443; G06F 9/445; G06F 9/541; G06F 11/073;
(Continued)

(56) References Cited

U.S. PATENT DOCUMENTS 6,066,181 A * 5/2000 DeMaster ................. G06F 8/30
717/108
6,081,665 A * 6/2000 Nilsen ................. G06F 9/45504
711/E12.011
(Continued)

OTHER PUBLICATIONS

NativeCtx, The Android Open Source Project, 2015, [Retrieved on Sep. 27, 2016]. Retrieved from the internet: <URL: http://atetric.com/atetric/javadoc/org.robolectric/android-all/6.0.0_r1-robolectric-0/src-html/android/media/ImageWriter.html> 14 Pages (1-14).*

(Continued)

*Primary Examiner* — Thuy Dao
*Assistant Examiner* — Anibal Rivera
(74) *Attorney, Agent, or Firm* — Knobbe Martens Olson & Bear LLP

(57) ABSTRACT

A method and system for memory management is disclosed. The disclosed method and system can prevent performance degradation due to automatic garbage collection associated with memory allocation for image processing. An image processing program includes two program modules. The first program modules is composed with a first language supporting a garbage collection feature but does not have a direct memory access which may trigger the garbage collection feature. The second program module is composed with a second language lacking the garbage collection feature. The image processing program delegates memory allocation for image processing to the second program module to prevent unnecessary activation of the garbage collection feature.

9 Claims, 5 Drawing Sheets

(51) Int. Cl.
*G06F 12/02* (2006.01)
*G06F 9/455* (2006.01)
*G06F 9/48* (2006.01)

(52) U.S. Cl.
CPC ........ *G06F 8/4441* (2013.01); *G06F 9/45504* (2013.01); *G06F 9/4856* (2013.01); *G06F 2212/1044* (2013.01)

(58) Field of Classification Search
CPC ............ G06F 12/0276; G06F 12/0269; G06F 12/0253; G06F 8/31; G06F 8/51; G06F 8/4441; G06F 8/4442; G06F 9/45508; G06F 9/45516; G06F 9/5016; G06F 9/4443; G06F 11/3471; G06F 11/3612; G06F 9/4856; G06F 9/5022; G06F 9/466; G06F 9/4552; G06F 9/30003; G06F 9/44; G06F 11/73; G06F 11/0751; G06F 11/3624; G06F 11/3409; G06F 12/023; G06F 8/30; G06F 8/437
See application file for complete search history.

(56) References Cited

U.S. PATENT DOCUMENTS

| | | | | |
|---|---|---|---|---|
| 6,289,506 B1* | 9/2001 | Kwong | ............... | G06F 9/45516 717/148 |
| 6,484,188 B1* | 11/2002 | Kwong | ................... | G06F 9/443 |
| 6,662,362 B1* | 12/2003 | Arora | .................... | G06F 8/4441 714/E11.209 |
| 6,684,393 B1* | 1/2004 | Loen | ................... | G06F 9/45516 707/999.202 |
| 6,701,520 B1* | 3/2004 | Santosuosso | ......... | G06F 8/4441 707/999.202 |
| 6,763,440 B1* | 7/2004 | Traversat | ............ | G06F 12/0276 707/999.202 |
| 6,823,523 B1* | 11/2004 | Campbell | ............. | G06F 9/4443 345/619 |
| 7,230,562 B1* | 6/2007 | Provis | .................... | G08C 17/02 341/173 |
| 7,263,700 B1* | 8/2007 | Bacon | .................... | G06F 9/445 707/999.202 |
| 7,436,345 B1* | 10/2008 | Provis | ................ | G06F 9/45508 340/12.22 |
| 7,496,897 B1* | 2/2009 | Dibble | ................ | G06F 9/45504 714/39 |
| 7,552,153 B2* | 6/2009 | Dostert | ............... | G06F 9/45504 |
| 8,127,280 B2* | 2/2012 | Thomas | ................ | G06F 8/4442 717/136 |
| 8,375,373 B2* | 2/2013 | Sollich | ...................... | G06F 9/44 717/143 |
| 8,943,260 B2* | 1/2015 | Ben-Yehuda | ......... | G06F 9/5022 711/170 |
| 9,176,718 B2* | 11/2015 | Yaffe | ......................... | G06F 8/51 |
| 2002/0056019 A1* | 5/2002 | Kolodner | ............. | G06F 9/5016 711/6 |
| 2002/0095556 A1* | 7/2002 | Kubooka | ............... | G06F 9/445 711/154 |
| 2002/0194421 A1* | 12/2002 | Berry | .................... | G11C 29/812 711/1 |
| 2003/0005027 A1* | 1/2003 | Borman | .................. | G06F 9/445 718/104 |
| 2004/0015920 A1* | 1/2004 | Schmidt | .................. | G06F 9/443 717/153 |
| 2005/0044540 A1* | 2/2005 | Savov | ...................... | G06F 9/541 717/166 |
| 2005/0289307 A1* | 12/2005 | Achanta | ............. | G06F 11/3409 711/159 |
| 2005/0289315 A1* | 12/2005 | Achanta | ............. | G06F 12/0269 711/170 |
| 2006/0190934 A1* | 8/2006 | Kielstra | ............. | G06F 9/45516 717/148 |
| 2006/0212657 A1* | 9/2006 | Tuel | .................... | G06F 12/0276 711/133 |
| 2007/0136719 A1* | 6/2007 | Lagergren | ............. | G06F 8/4441 717/140 |
| 2007/0192818 A1* | 8/2007 | Bourges-Sevenier | ............ | H04L 12/2803 725/132 |
| 2007/0288538 A1* | 12/2007 | Bacon | ................. | G06F 12/0269 |
| 2007/0294679 A1* | 12/2007 | Bobrovsky | ......... | G06F 9/45516 717/146 |
| 2009/0006506 A1* | 1/2009 | DiFlora | ............... | G06F 12/0269 |
| 2009/0276431 A1* | 11/2009 | Lind | ....................... | G06F 9/466 |
| 2009/0296685 A1* | 12/2009 | O'Shea | .................... | H04L 69/32 370/351 |
| 2010/0287352 A1* | 11/2010 | Chapman | ............ | G06F 12/0269 711/170 |
| 2011/0041137 A1* | 2/2011 | Carmody | ............ | G06F 9/30003 718/107 |
| 2011/0107050 A1* | 5/2011 | Vengerov | ............ | G06F 12/0269 711/170 |
| 2011/0185129 A1* | 7/2011 | Landau | ............... | G06F 12/0253 711/147 |
| 2011/0264713 A1* | 10/2011 | Ylonen | ............... | G06F 12/0269 707/818 |
| 2011/0320682 A1* | 12/2011 | McDougall | ........... | G06F 12/023 711/6 |
| 2012/0167066 A1* | 6/2012 | Hawblitzel | ......... | G06F 11/3624 717/146 |
| 2012/0216015 A1* | 8/2012 | Mitra | .................... | G06F 9/4552 712/28 |
| 2012/0271866 A1* | 10/2012 | Lucco | ................. | G06F 12/0253 707/819 |
| 2013/0325912 A1* | 12/2013 | Corrie | ................. | G06F 12/0253 707/813 |
| 2014/0032205 A1* | 1/2014 | Yaffe | ......................... | G06F 8/31 703/26 |
| 2014/0040860 A1* | 2/2014 | Darcy | .................... | G06F 8/437 717/114 |
| 2015/0227414 A1* | 8/2015 | Varma | .................... | G06F 11/073 714/47.1 |
| 2015/0234693 A1* | 8/2015 | Palframan | ........... | G06F 11/0751 714/37 |
| 2015/0268989 A1* | 9/2015 | Busch | ................... | G06F 9/4856 711/103 |
| 2015/0286511 A1* | 10/2015 | Mickens | ............... | G06F 9/4856 719/320 |

OTHER PUBLICATIONS

Miaobo Chen et al., JAVA JNI Vridge: A Framework for Mixed Native ISA Execution, 2006, [Retrieved on Aug. 29, 2017]. Retrieved from the internet: <URL: http://ieeexplore.ieee.org/stamp/stamp.jsp?arnumber=1611530> 11 Pages (1-11).*

David F. Bacon et al., A Real-time Garbage Collector with Low Overhead and Consistent Utilization, Jan. 15-17, 2013, [Retrieved on Aug. 29, 2017]. Retrieved from the internet: <URL: http://delivery.acm.org/10.1145/610000/604155/p285-bacon.pdf> 14 Pages (285-298).*

* cited by examiner

Fig. 4a

```
int[] nativeHandle = new int[1];           // Declare variable in which reference data will be saved (C11)
ret = NativeGL.AllocateNativeBuffer(nativeHandle, size);     // Call for native code (C12)
```

Fig. 4b

```
JNIEXPORT void JNICALL                     // Java Native Interface
Java_com_NativeGL_AllocateNativeBuffer(
        JNIEnv*       env,
        jobject       thiz,
        jintArray     nativeHandleArray, /* Java int array variable in which int-transformed
memory pointer will be saved*/
        jint          size )
{
        void*    ptr = NULL;      // Pointer-type variable in which reference data will be saved
        int*     pOutputBufferArray = NULL;

// Transform Java int array into C int array
        pOutputBufferArray = (*env)->GetIntArrayElements(env, nativeHandleArray, NULL);

// Allocate memory (C21)
        ptr = malloc(size);

// After memory pointer prt is transformed into integer,
        // ptr is saved in int array
        // (where ptr is transferred by changing 0th value of Java-side int array) (C22)
        pOutputBufferArray[0] = (int) ptr;

// Release resource allocated to use Java int array
        (*env)->ReleaseIntArrayElements(env, nativeHandleArray, pOutputBufferArray, 0);

return;
}
```

Fig. 4c

```
public void texUpload(
        BasicTexture texture,
        int xOffset, int yOffset,
        int nativeHandle,
        int format, int type)
{
        int target = texture.getTarget();         // Bring data to be uploaded (C31)

// Call for native code (C32)
        NativeGL.glTexUploadToNativeBuffer(
                target, 0, xOffset, yOffset,
                texture.getWidth(), texture.getHeight(),
                format, type, nativeHandle);
}
```

Fig. 4d

```
JNIEXPORT void JNICALL                          // Java Native Interface
Java_com_nativeGL_NativeGL_glTexUploadToNativeBuffer(
        JNIEnv* env, jobject thiz,
        jint target, jint level,
        jint xOffset, jint yOffset,
        jint width,  jint height,
        jint format, jint type,
        jint nativeHandle)
{
           // Transform int value brought from Java side into memory pointer (C41)
           void* ptr = (void*)nativeHandle;

// Texture upload function provided by OpenGL (C42)
             glTexSubImage2D(
                  target, level, xOffset, yOffset,
                  width, height,
                  format, type, ptr);
}
```

METHOD AND SYSTEM FOR PROCESSING MEMORY

CROSS-REFERENCE TO RELATED APPLICATIONS

This application claims priority to and the benefit of Korean Patent Application No. 10-2014-0090781 filed in the Korean Intellectual Property Office on Jul. 18, 2014, the entire contents of which are incorporated herein by reference.

BACKGROUND

Field of the Invention

The present disclosure relates to a memory management method and system. More particularly, a memory management method and system according to a certain embodiment of the invention relates to preventing performance degradation in image processing due to garbage collection.

Description of Related Art

Garbage collection (GC), a form of memory management, refers to a function of automatically releasing a memory area occupied by an object that is no longer in use from memory areas dynamically allocated by a program. The object that is no longer in use refers to the object unreachable by any variable.

In programming environments in which garbage collection is supported, programmers are freed from manually dealing with the entirety of dynamically-allocated memory areas. It is possible to advantageously prevent dangling pointer bugs, double free bugs, memory leaks, and the like. However, it may be relatively expensive to determine which memory to release. That is, even in a situation in which a programmer is aware of a point in time at which an allocated area of memory will be no longer needed, a garbage collection algorithm is required to track a point in time at which the memory area will be released. This operation requires a significant amount of overhead.

In particular, in graphic processing that requires fast rates, the overhead of garbage collection degrades performance, making the problem more serious. For example, in a graphic application written in JAVA, a language supporting garbage collection, operations of saving a raw image to be drawn in a memory and transmitting the raw image to a graphic apparatus are undertaken in order to draw an image. In general, a JAVA array or array-type objects (buffers, arrays, or the like) are used in order to use a memory. In particular, it is possible to only use a direct buffer generated through direct allocation in order to use graphic libraries (GLs). Android can use a bitmap, a dedicated image object. Consequently, a JAVA (or Android) graphic application must use a direct buffer or a bitmap in order to save a raw image in dynamic random access memory (DRAM). However, when JAVA manages and uses memory as in the case of the direct buffer or the bitmap, since the memory management is automatically executed by JAVA, garbage collection may occur, thereby degrading rendering performance. In order to overcome this problem, memory pooling is used. However, garbage collection may still occur before the first memory pool becomes full. In addition, a large amount of memory must be used in order to maintain the memory pool.

In addition, when an application or software is coded entirely in a native language in order to prevent automatic garbage collection that occurs in the JAVA environment, the ease and convenience of coding achievable by an advanced programming language, such as JAVA, must be abandoned.

BRIEF SUMMARY

Various aspects of the present invention provide a system and method able to improve performance by preventing garbage collection in an allocated memory portion while executing dynamic memory allocation using an application written in a programming language that carries out automatic memory management through garbage collection.

Also provided a system and method able to prevent garbage collection in a dynamically created buffer that is necessary for image processing, such that an image can be rapidly rendered.

According to an aspect of the present invention a method for managing memory is provided. For example, for memory management of image processing, a computing system can execute/utilize at least two programs (program modules). A first one of the programs is composed with (based on) a first program language which provides automatic garbage collection feature on a dynamic memory for image processing. To prevent performance degradation due to undesirable activation of the garbage collection feature associated with the first program language, the computing system may deactivate the garbage collection feature (associated with memory allocation) while utilizing the first module or may exclude execution of a program (module) that will activate the garbage collection feature. For memory management required for the image processing, the computing system execute/utilize a second program (module) composed with (based on) a second program language that does not support the automatic garbage collection feature. The second program handles allocation/access of memory for the image processing while not activating/requesting automatic garbage collection feature. The computing system utilizes combination of the first and second program modules based on different program languages and may delegate memory handling only to a program module which is not associated with automatic garbage collection feature. The first program module is configured to, when executed by the computer system, call for the second program module for memory allocation/access cause the first program module may not access memory for image processing and can only access memory indirectly via the second memory program module. As discussed above, an image processing program executable at a computer system may be a combination of a first program module that is composed with a first language supporting a garbage collection feature but does not have a (direct) memory access necessarily triggering the garbage collection feature, and a second program module that is composed with a second language lacking the garbage collection feature. The image processing program may limit memory allocation for image processing only to program modules which will not activate the garbage collection feature. The image processing program may limit memory allocation by program module which will the garbage collection feature during the memory allocation.

According to an aspect of the present invention, a memory management method including: (a) requesting, at a first module corresponding to codes written in a first programming language, a second module corresponding to codes written in a second programming language for memory allocation; and (b) allocating, at the second module, a target memory portion in response to the request for memory allocation, and returning reference data indicating the allocated target memory portion to the first module. The first programming language is a programming language that carries out garbage collection in a case of memory allocation. The second programming language is a programming language that does not carry out garbage collection in the case of memory allocation.

According to an embodiment, the memory management method may further include: (c) requesting, at the first module, the second module to write data in the target memory portion indicated by the reference data by transferring the reference data to the second module; and (d) writing, at the second module, the data in the target memory portion indicated by the reference data in response to the request to write the data by the first module.

According to an embodiment, the (b) operation may include: allocating, at the second module, the target memory portion in response to the request for memory allocation; transforming a type of the reference data indicating the allocated target memory portion into an integer type; and returning the reference data, the type of which is transformed into the integer type, to the first module.

According to an embodiment, the (c) operation may include requesting, at the first module, the second module to write the data in the target memory portion indicated by the reference data by transferring the reference data, the type of which is transformed into the integer type, to the second module. The (d) operation may include: transforming, at the second module, the type of the reference data, which is transformed into the integer type, into a pointer type; and writing the data in the target memory portion indicated by the reference data, the type of which is transformed into the pointer type.

According to an embodiment, the first programming language may be JAVA, and the second programming language may be a native language.

According to an embodiment, the (a) operation may request the second module for memory allocation using a JAVA Native Interface (JNI).

According to an embodiment, the data may be image data.

According to another aspect of the present invention, a computer readable writing medium has a program recorded therein, the program enabling the above-described method to be carried out.

According to further another aspect of the present invention, a memory management system includes: a processor; and a memory storing a computer program that the processor executes. The computer program enables the memory management system to carry out the above-described method when the computer program is executed by the processor.

According to still another aspect of the present invention, a memory management system includes: a first module corresponding to codes written in a first programming language; and a second module corresponding to codes written in a second programming language. The first module requests the second module for memory allocation. The second module allocates a target memory portion in response to the request for memory allocation and returns reference data indicating the allocated target memory portion to the first module. The first programming language is a programming language that carries out garbage collection in a case of memory allocation. The second programming language is a programming language that does not carry out garbage collection in the case of memory allocation.

According to an embodiment, the first module may request the second module to write data in the target memory portion indicated by the reference data by transferring the reference data to the second module, and the second module may write the data in the target memory portion indicated by the reference data in response to the request to write the data by the first module.

According to an embodiment, the second module may allocate the target memory portion in response to the request for memory allocation, transforms a type of the reference data indicating the allocated target memory portion into an integer type, and returns the reference data, the type of which is transformed into the integer type, to the first module. The first module may request the second module to write the data in the target memory portion indicated by the reference data by transferring the reference data, the type of which is transformed into the integer type, to the second module. In response to the request to write the data by the first module, the second module may transform the type of the reference data, which is transformed into the integer type, into a pointer type, and write the data in the target memory portion indicated by the reference data, the type of which is transformed into the pointer type.

According to an embodiment, the first programming language may be JAVA, and the second programming language may be a native language. The first module may request the second module for memory allocation using a JNI.

According to yet another aspect of the present invention, a computer program stored in a recording medium includes: a first code part written in a first programming language; and a second code part written in a second programming language. The first code part includes codes requesting the second code part for memory allocation. The second code part includes codes allocating a target memory portion in response to the request for memory allocation and returning reference data indicating the allocated target memory portion. The first programming language is a programming language that carries out garbage collection in a case of memory allocation. The second programming language is a programming language that does not carry out garbage collection in the case of memory allocation.

According to an embodiment, the first code part may further include codes requesting the second code part to write data in the target memory portion indicated by the reference data by transferring the reference data to the second code part. The second code part may further include codes writing the data in the target memory portion indicated by the reference data in response to the request to write the data by the first code part.

According to embodiments of the present invention, since memory-related events (e.g. memory allocation and de-allocation) are carried out in a native language while the other events are coded in a language that provides the ease of coding, such as JAVA, it is possible to prevent undesirable garbage collection and resultant degradations in the performance of the entire system. When dynamic memory allocation or memory de-allocation is carried out in the JAVA environment, garbage collection may occur, thereby causing degradations in performance due to garbage collection overhead. In contrast, according to embodiments of the present invention, dynamic memory allocation is carried out in the native environment instead of the JAVA environment, whereby undesirable garbage collection can be prevented from being carried out.

In particular, unnecessary garbage collection may affect the entire memory of the system, thereby degrading not only the performance of software (application) that enabled the garbage collection but also the performance of the entire system (for example, the process or the like stands by until garbage collection is completed). Embodiments of the present invention can advantageously prevent this problem.

In addition, since JAVA has limited process memory areas, memory allocation is restricted even in the case in which the memory has a marginal space. In contrast, a certain embodiment of the present invention carries out dynamic memory allocation in the native environment, such that, when a physical memory has a sufficient space, more memory portions can be used.

In particular, according to embodiments of the present invention, it is possible to prevent garbage collection in a buffer necessary for image processing by allocating the buffer in the native environment, whereby an image can be rapidly rendered.

BRIEF DESCRIPTION OF THE DRAWINGS

A brief description is given for the enhancement of understanding of the accompanying drawings, in which:

FIG. 4A, FIG. 4B, FIG. 4C, and FIG. 4D illustrate JAVA and C codes corresponding to the memory management system according to the exemplary embodiment of the present invention illustrated in FIG. 3.

DETAILED DESCRIPTION

Figure 1:
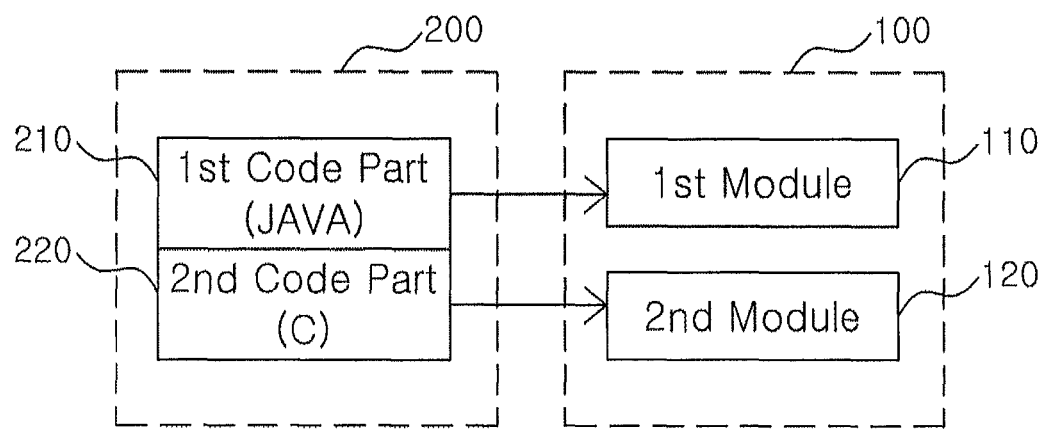
FIG. 1 is a block diagram illustrating a memory management system according to an exemplary embodiment of the present invention.

The present invention has other advantages associated with the operation of the present invention and objects that may be realized by the practice of the present invention which will be apparent from, or are set forth in greater detail in the accompanying drawings, which are incorporated herein, and in the following Detailed Description of the Invention, which together serve to explain certain embodiments of the present invention.

Herein, it will be understood that, when an element is referred to as "transmitting" data to another element, the element can not only directly transmit data to another element but also indirectly transmit data to another element via at least one intervening element.

In contrast, when an element is referred to as "directly transmitting" data to another element, the element can transmit the data to another element without an intervening element.

Embodiments of the present invention will now be described more fully hereinafter with reference to the accompanying drawings, in which exemplary embodiments thereof are shown. Reference should be made to the drawings, in which the same reference numerals and signs are used throughout the different drawings to designate the same or similar components.

FIG. 1 is a block diagram illustrating a memory management system 100 according to an exemplary embodiment of the present invention.

Referring to FIG. 1, the memory management system 100 includes a first module 110 and a second module 120. In some embodiments of the present invention, some of the above-described components may not be necessary for embodying the present invention, and the memory management system 100 may include more components.

The memory management system 100 may have a hardware resource and/or a software resource in order to implement embodiments of the present invention, and does not necessarily indicate a single physical component or a single device. Specifically, the memory management system 100 may be implemented as a logical combination of hardware and/or software provided to implement embodiments of the present invention, and if necessary, may be implemented as an assembly of logical components disposed at separate devices to perform their own individual functions in order to implement embodiments of the present invention. In addition, the memory management system 100 may indicate an assembly of components provided according to the functions or roles to implement embodiments of the present invention.

Herein, the term "module" may refer to a functional and/or structural combination of hardware for implementing embodiments of the present invention and software for enabling the hardware to operate. For example, the module may indicate a logical unit of codes and hardware resources that execute the codes. It will be apparent to a person skilled in the art to which the present invention relates that the module does not necessarily indicate either physically-connected codes or one type of hardware.

The first module 110 may correspond to a first code part 210 written in a first programming language, and the second module 120 may correspond to a second code part 220 written in a second programming language. Herein, a specific module corresponding to a specific code part may indicate that the specific module (e.g. the first module 110) includes the specific code part or a result produced by compiling the specific code part or that the specific module is implemented as a combination of the specific code part or the result produced by compiling the specific code part and hardware resources executing the specific code part or the result.

The first code part 210 and the second code part 220 may be included in program codes 200 constituting a single application. The program codes 200 including the first code part 210 and the second code part 220 may be included in a single file or a single project.

The first programming language may be a programming language that executes garbage collection in allocated memory, and the second programming language may be a programming language that does not execute garbage collection. For example, the first programming language may be supposed to automatically execute when memory is allocated by the first programming language, and the second programming language may not be supposed to automatically execute garbage collection in the case of memory allocation. For example, the first programming language may be one selected from among, but not limited to, JAVA, SMALLTALK, RUBY, PYTHON, HYPERTEXT PREPROCESSOR (PHP), JAVASCRIPT, BASIC, and the like. The second programming language may be one selected from among, but not limited to, C, C++, DELPHI, and the like. In some embodiments, the second programming language may be referred to as a native language. The native language indicates a language in which codes that run in a computer's machine language or that are directly compiled by an operating system (OS) can be written. For example, the native language may be C.

In the following description, the first programming language will be regarded as JAVA and the second programming language will be regarded as C, but this is not intended to be limiting. It will be apparent to a person skilled in the art to which the invention belongs that embodiments of the invention can be applied to other embodiments in which the first programming language is a programming language that carries out garbage collection and the second programming language is a programming language that does not carry out garbage collection.

As described above, the first module 110 corresponding to codes written in the first programming language (i.e. JAVA) can operate in the JAVA environment. The second module 120 corresponding to codes written in the second programming language (i.e. C) can operate in the native environment.

Figure 2:
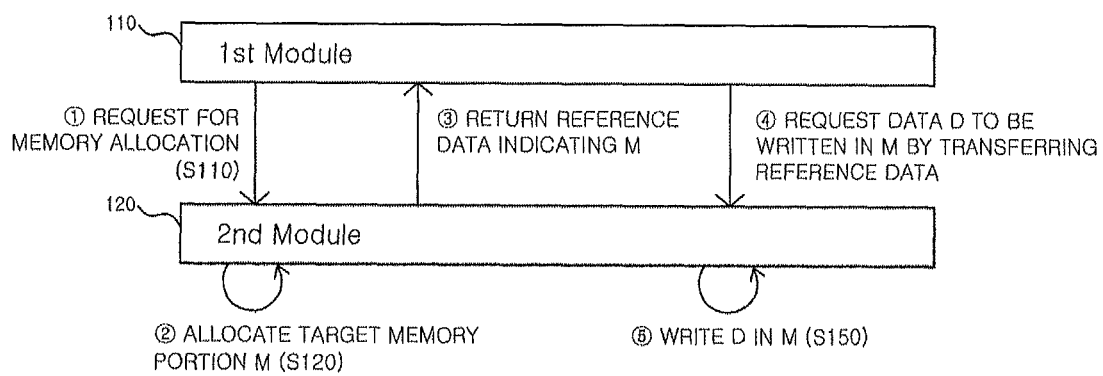
FIG. 2 illustrates a memory management method carried out by the memory management system according to the exemplary embodiment of the present invention.

FIG. 2 illustrates a memory management method carried out by the first module 110 and the second module 120 according to the present embodiment.

Referring to FIG. 2, at S110, the first module 110 requests the second module 120 for memory allocation. In an embodiment, the first module 110 may call for a function or a method included in the second module 120 when attempting the memory allocation request. The first module 110 can transfer data regarding the size of a memory to be allocated to the second module 120. For example, the first module 110 can send a parameter indicating the size of the memory to be allocated when calling for the function included in the second module 120.

At S120, the second module 120 allocates a target memory portion M in response to the memory allocation request by the first module 110. Subsequently, at S130, the second module 120 returns reference data indicating the allocated target memory portion M to the first module 110. The reference data may be an address value (point) of a memory space, but this is not intended to be limiting. The reference data may indicate data allowing access to the allocated memory portion.

In an embodiment in which the first code part 210 corresponding to the first module 110 is written in JAVA and the second code part 220 corresponding to the second module 120 is written in C, the first module 110 can request the second module 120 for memory allocation using a JAVA native interface (hereinafter referred to as a "JNI"). The JNI is a programming framework that enables a JAVA code running in a JAVA virtual machine (JVM) to call and be called by native application programs (more particularly, application programs specific to hardware and OS platforms) and libraries written in a native language, such as C, C++, or assembly language.

As such, a certain embodiment of the present invention enables dynamic memory allocation to be carried out in the native environment instead of being directly carried out in the JAVA environment in which garbage collection in a dynamic memory may occur.

When dynamic memory allocation or memory de-allocation is directly carried out in the JAVA environment, garbage collection may occur, so degradations in performance may occur due to garbage collection overhead. In contrast, according to embodiments of the present invention as described above, dynamic memory allocation is carried out in the native environment instead of the JAVA environment, thereby preventing potential garbage collection.

In addition, in the JAVA environment, there is a problem that dynamic memory allocation may not be enabled even if a heap area, or a pool of a dynamic memory, has a remaining memory space. In contrast, according to embodiments of the present invention, dynamic memory allocation is always enabled if a sufficient memory space remains in the heap area, since dynamic memory allocation is carried out in the native environment.

Returning to FIG. 2, at S140, the first module 110 requests the second module 120 to write data D in the target memory portion M by transferring the reference data to the second module 120. In the same manner as described above, the data writing request may be in the form of function calls. Afterwards, at S150, the second module 120 writes the data in the target memory portion M indicated by the reference data, in response to the data writing request.

Figure 3:
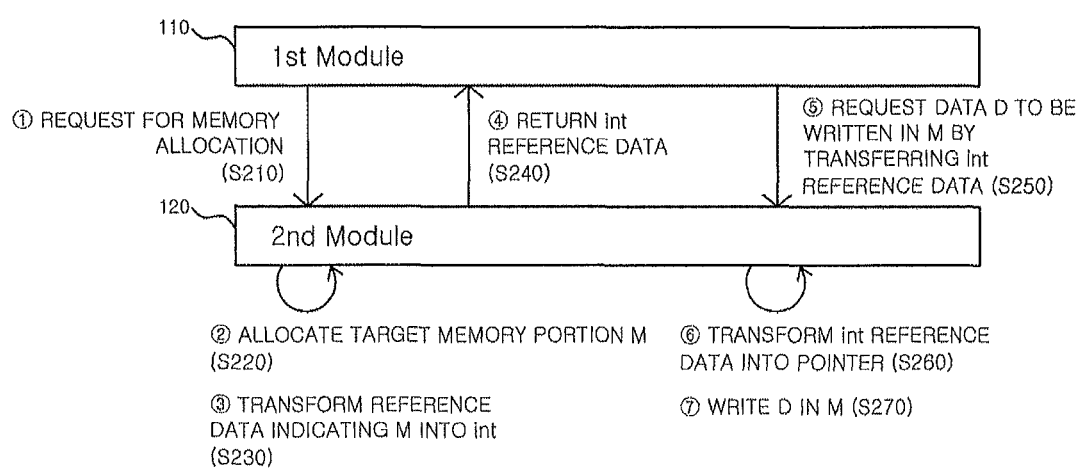
FIG. 3 illustrates another memory management method carried out by the memory management system according to the exemplary embodiment of the present invention.

FIG. 3 illustrates another memory management method carried out by the first module 110 and the second module 120 according to the present embodiment. In the description of FIG. 3, detailed descriptions of some features will be omitted in the case in which they are identical to those described above.

Referring to FIG. 3, at S210, the first module 110 requests the second module 120 for memory allocation.

At S220, the second module 120 allocates a target memory portion M in response to the memory allocation request.

Reference data regarding the memory allocated by the second module may be a pointer indicating a memory address. This is not a type of data that can be directly managed in the JAVA environment. Thus, the second module 120 transforms the reference data indicating the target memory portion M into integer-type (int type) data at S230, and returns the integer-type reference data to the first module 110 at S240.

As such, the second module 120 enables the first module 110 to save or manage the reference data by transforming the pointer-type reference data into the integer-type reference data that can be processed in the JAVA environment and returning the integer-type reference data to the first module 110.

After that, at S250, the first module 110 requests the second module 120 to write data D in the target memory portion M indicated by the reference data by transferring the integer-type reference data to the second module 120.

Subsequently, the second module 120 transfers the integer-type reference data into pointer-type reference data at S260, and writes the data D in the target memory portion M indicated by the pointer-type reference data.

FIG. 4A, FIG. 4B, FIG. 4C, and FIG. 4D illustrate JAVA and C codes corresponding to the first module 110 and the second module 120 according to the present embodiment illustrated in FIG. 3. Specifically, FIG. 4A and FIG. 4C illustrate JAVA codes corresponding to the first module 110 (i.e. codes included in the first code part 210). FIG. 4B and FIG. 4D illustrate C codes corresponding to the second module 120 (i.e. codes included in the second code part 220).

Referring to FIG. 4A, in C11, the first code part 210 declares an integer-type variable in which reference data will be saved. Since JAVA uses call-by-value semantics by default, an array of integers is used such that the reference can be accepted as a function argument. In C12, in order to request memory allocation, the first code part 210 calls for a function AllocateNativeBuffer( ) declared to the second code part.

FIG. 4B illustrates the AllocateNativeBuffer( ) function included in the second code part 220 and called by the first code part 210. Referring to FIG. 4B, in C21, the AllocateNativeBuffer( ) function allocates a target memory portion. Here, reference data indicating the target memory portion is saved in a pointer-type variable ptr.

In C22, the AllocateNativeBuffer( ) function transforms the memory pointer ptr into an integer type and subsequently saves the ptr in the array of integers (where the ptr is transferred by changing the $0^{th}$ value of the JAVA-side int array).

FIG. 4C illustrates a function texUpload( ) executing a writing request to upload an image texture to an allocated target memory portion. Specifically, in C31, the texUpload( ) function acquires image texture data to be uploaded to the target memory portion. In C32, the texUpload( ) function calls for a function Native GL_gl Tex Upload To Native Buffer( ) declared to the second code part 220 by transferring the integer-type reference data to the second module 120 in order to request the uploading data to be written in the target memory portion indicated by the reference data.

FIG. 4D illustrates a function Native GL_gl Tex Upload To Native Buffer( ) that is included in the second code part 220 and is called by the first code part 210. Referring to FIG. 4D, in C41, the Native GL_gl Tex Upload To Native Buffer( ) function transforms the integer-type reference data brought from the JAVA side into a memory pointer type. In C42, the Native GL_gl Tex Upload To Native Buffer( ) function calls for a function glTexSubImage2D( ) provided by graphic libraries in order to upload the data to the target memory portion indicated by the pointer-type reference data.

In some embodiments, the data may be image data, in which case the first module 110 and the second module 120 can be included in an application or a system displaying an image. In this case, most functions for processing the image are processed by the first module 110 corresponding to the codes written in JAVA that can be relatively easily embodied, and only some functions for allocating a memory portion and writing (uploading) the image (texture) in (to) the allocated memory portion can be processed by the second module 120 corresponding to the native codes. For example, the first module 110 can decode an image to be displayed, and can request the second module 120 for memory allocation in order to create a buffer in the native environment, in which the decoded image will be saved in the buffer. In addition, the first module 110 can request the second module 120 to upload the image to be decoded to the allocated memory portion, and can display the uploaded image.

According to embodiments of the present invention as set forth above, a buffer necessary for image processing is allocated to the native environment. This can consequently prevent garbage collection in the generated buffer, such that an image can be rapidly rendered.

In some implementations, the memory management system 100 may include a processor and a memory that stores programs that the processor executes. The processor may be implemented as a single-core central processing unit (CPU) or a multi-core CPU. The memory be implemented as high-speed random access memory (RAM); or may be implemented as nonvolatile memory, such as at least one magnetic disk storage device, a flash memory device or other nonvolatile solid-state memory. Access to the memory by the processor or other components may be controlled by a memory controller. When the program is executed by the processor, it enables the memory management system 100 according to the present embodiment to execute the memory management method as described above.

The memory management method according to the present invention can be embodied as computer readable program commands and can be stored in a computer readable recording medium. In addition, a control program and a target program according to the present embodiment can be stored in a computer readable recording medium. The computer readable recording medium includes all sorts of recording devices that store data readable by a computer system.

The program commands recorded in the recording medium may be specially designed and constructed for the present invention, or may be well-known to and used by a person skilled in the art related to software.

Examples of the computer readable recording medium may include, but not limited to, magnetic media, such as a hard disk, a floppy disk and a magnetic tape; optical media, such as compact disc read-only memory (CD-ROM) and a digital versatile disc (DVD); magneto-optical media, such as a disk; a read-only memory (ROM); and other hardware devices specially constructed to store and execute program commands, such as read-only memory (ROM), random-access memory (RAM) and flash memory. The computer readable recording medium may also be in the form of light or a carrier wave that conveys signals specifying program commands, data structures, or the like, or a transmission medium, such as a metal wire or a waveguide. In addition, the computer readable recording medium may be distributed to computer systems on the network, in which computer readable codes are stored and executed in a decentralized fashion.

Examples of the program commands include not only machine languages generated by compilers, but also advanced languages that may be executed by an information processing device, for example, a computer, that electronically processes information using an interpreter.

The hardware devices described above may be constructed such that they can operate as one or more software modules for performing the operations of the present invention, and vice versa.

While the present invention has been illustrated and described with reference to the certain exemplary embodiments thereof, it will be understood by those skilled in the art that various changes in form and details may be made therein without departing from the spirit and scope of the invention as defined by the appended claims. Therefore, the foregoing embodiments should be understood as being illustrative but not limitative purposes. For example, some parts described as being located in a single physical entity can be implemented as being distributed to a plurality of physical devices. In the same fashion, some parts described as being distributed to a plurality of physical devices can be located in a single physical entity.

The scope of the present invention is defined not by the detailed description of the invention but by the appended claims, and all differences within the scope will be construed as being included in the present invention.

What is claimed is:

1. A method of processing image data, the method comprising:
   providing computer-executable software comprising a first module and a second module, the first module corresponding to codes written in a JAVA programming language, the second module corresponding to codes written in a non-JAVA programming language;
   wherein the JAVA programming language requires automatic memory garbage collection when performing a memory allocation routine of the JAVA programming language whereas the non-JAVA programming language does not require automatic memory garbage collection when performing a memory allocation routine of the non-JAVA programming language;

wherein the second module comprises a memory allocation routine that does not accompany memory garbage collection;

wherein the first module comprises an image processing routine of the JAVA programming language for processing image data in a memory allocated by the memory allocation routine of the second module;

wherein the first module does not comprise the memory allocation routine of the JAVA programming language and is configured to activate the memory allocation routine of the second module for performing memory allocation without automatic memory garbage collection; and executing computer-executable software in a computing system such that the first module and the second module are executed without automatic memory garbage collection when performing the memory allocation routine of the second module.

2. The method according to claim 1, wherein the second module is configured to, when executed, return reference data identifying an allocated memory;

wherein the first module is configured to, when executed, cause the computing system to write image data in the allocated memory using the reference data.

3. The method according to claim 2, wherein the second module is further configured to return the reference data in an integer type.

4. The method according to claim 3, wherein the first module is further configured to request the second module to write the image data in the allocated memory by transferring the reference data to the second module, and wherein the second module is further configured to transform the reference data into a pointer type and to write the image data in the allocated memory using the reference data into the pointer type.

5. The method according to claim 1, wherein the codes of the first module uses a Java Native Interface (JNI) for activating the memory allocation routine of the second module.

6. A non-transitory computer readable recording medium in which a program enabling the method as claimed in claim 1 to be carried out is recorded.

7. A system comprising:

a processor; and a memory storing a computer program that the processor executes, wherein the computer program enables the system to carry out the method as claimed in claim 1 when the computer program is executed by the processor.

8. A computer program stored in a non-transitory recording medium comprising:

a first code part written in a JAVA programming language and corresponding to a first module of computer-executable software; and a second code part written in a non-JAVA programming language and corresponding to a second module of computer-executable software, wherein the JAVA programming language requires automatic memory garbage collection when performing a memory allocation routine of the JAVA programming language whereas the non-JAVA programming language does not require automatic memory garbage collection when performing a memory allocation routine of the non-JAVA programming language, wherein the second module comprises a memory allocation routine that does not accompany memory garbage collection, wherein the first module comprises an image processing routine of the JAVA programming language for processing image data in a memory allocated by the memory allocation routine of the second module, wherein the first module does not comprise the memory allocation routine of the JAVA programming language and is configured to activate the memory allocation routine of the second module for performing memory allocation without automatic memory garbage collection such that the first module and the second module are executed without automatic memory garbage collection when performing the memory allocation routine of the second module.

9. The computer program according to claim 8, wherein the second code part comprises at least one command for returning reference data identifying an allocated memory, wherein the first code part further comprises codes to write image data in the allocated memory using the reference data.

* * * * *